3,379,523
HOT-PRESSING OF DECOMPOSABLE COMPOUNDS TO FORM OXIDE-CONTAINING PRODUCTS
Asoke Chandra Das Chaklader, Vancouver, British Columbia, Canada, assignor to Canadian Patents and Development Limited, Ottawa, Ontario, Canada, a corporation of Canada
No Drawing. Filed Dec. 14, 1964, Ser. No. 418,282
8 Claims. (Cl. 75—206)

ABSTRACT OF THE DISCLOSURE

A process for producing dense hard oxide or cermet products from decomposable starting material which decomposes to yield an oxide when heated to a temperature between about 300 and 1000° C., which process includes heating said material to said decomposition temperature and at least while the decomposition is occurring, applying pressure to the material, the material being confined in a mold while it is being subjected to pressure.

---

This invention relates to a process for preparing dense, hard products from various solid oxides including metal oxides, and to the improved products produced by the process. Even more particularly the present invention relates to a process for preparing dense, hard products containing a significant amount of at least one of zirconia ($ZrO_2$), alumina ($Al_2O_3$), iron oxide ($Fe_2O_3$), magnesia (MgO), beryllium oxide (BeO), uranium dioxide ($UO_2$-uranous oxide), thorium oxide ($ThO_2$), talc, or cermets containing a metal oxide and metal. In the specification which follows, particular emphasis will be placed on the preparation of those oxide products which are presently of substantial commercial significance.

In the past the what might be called "classical" process (as utilized to form products containing solid oxides, where indeed such formation has even been possible under any circumstances), has been to form the oxide-containing material into the required shape through the use of dies and a press and subsequently sinter the formed product at elevated temperatures (usually much above 1000° C.) to give it compressive strength and hardness. It is also known to sinter under pressure, this process being known generally as a "hot pressing" process.

These known processes possess many disadvantages. One is that the sintering time required is normally of the order of a number of hours to days above about 1400° C., the result being a very slow as well as expensive process insofar as the heat energy required is concerned.

A further disadvantage is that some refractory oxides, in particular $ZrO_2$, undergo a phase transformation involving a significant volume change at temperatures lower than the range required for the aforementioned "classical" fabrication techniques. Cooling of the formed body from the fabrication temperature through such phase transformation will result in extensive crack formation, such that the final product has very poor or no strength and no effective interparticle bonding. For this reason, non-stabilized zirconia cannot be fabricated by sintering or by standard hot pressing techniques, that is by subjecting the material to pressure while sintering. In fact insofar as is known very strong and dense non-stabilized zirconia could not be fabricated by any known conventional commercially feasible processes, prior to the present invention. It could only be used in powder form. Therefore non-stabilized zirconia products prepared by the process of the present invention will, of course, be unstable at temperatures above the phase transformation (1100° C.). However, there are many potential applications for these new products below this temperature.

It is known to fabricate zirconia by first stabilizing it and subsequently fabricating it by conventional fabrication techniques. Stabilized zirconia is zirconia which has no phase transformation, this transformation having been suppressed by making a solid solution of the zirconia with other materials such as for example CaO. A disadvantage of stabilized zirconia is that it is more chemically reactive than non-stabilized zirconia.

Non-stabilized zirconia is a very non-reactive oxide and therefore is highly desirable as crucible or refractory material. In the past as previously indicated, the practice has been to utilize stabilized zirconia when forming zirconia-containing structures but one disadvantage of this process is obvious in that the preparation of the solid solution requires suitable mixing apparatus, a problem which could be avoided if non-stabilized zirconia could be utilized as a starting material. The process of the present invention is particularly suited for producing very dense (greater than 99%) non-stabilized zirconia products of all sizes and shapes. Obviously the advantages of being able to produce commercially such a product are substantial.

Also known is the process disclosed in U.S. application Ser. No. 402,654, filed Oct. 8, 1964, in the name of Chaklader and McKenzie. In that process clays, mostly alumino-silicates, are subjected to pressure while undergoing dehydroxylation. On the other hand the present process is directed to the formation of dense, hard, metal oxide-containing materials utilizing a crystal phase change or a decomposition reaction to free the crystal bonds. In the case of, for example, alumina, the process of the present invention is very similar and/or an extension to that disclosed in Ser. No. 402,654 for alumino-silicates depending upon the starting materials employed and the characteristics required for the final product. By decomposition is meant any reaction which involves loss of mass by forming a vapour phase during the reaction. This also involves atom movements in the solid lattice, i.e. from its stable position to another position and not thermal vibration.

It is the principal object of the present invention to provide an improved process for forming solid oxides and in particular metal oxides or mixtures thereof with other metal or reinforcing filler material, which process can normally be carried out more economically and with better results than known long-used processes to yield a product having characteristics which are similar to those previously obtainable by any means. There are also provided certain novel products.

The process of the present invention essentially involves the application of pressure during a heat-initiated molecular bond disruption caused by (a) the polymorphic transformation of a solid oxide or (b) the decomposition of a material which on decomposition will produce an oxide. The process of this invention is particularly suitable for use in fabricating and highly densifying materials. The required phase transformations or decompositions generally occur well below the usual sintering temperatures, often with the obvious result of the present process requiring much less heat energy than known processes.

In the case of oxides other than zirconia, such as alumina, magnesia, beryllia, thoria, urania and iron oxides, the materials can be fabricated and densified by the process of this invention using a decomposition reaction. The starting materials would be any compounds such as carbonates, bicarbonates, sulphates, nitrates, hydroxides, hydrated hydroxides etc. which on decomposition would yield an oxide or mixture of oxides. In this particular embodiment the chemical composition of the starting materials would be different from the final products. Alumina, iron oxide and cermets can be also subjected to the process of this invention at a temperature causing crystal phase change rather than using a decomposition reaction.

In carrying out the process of this invention the raw material is formed to the required shape in a die and then heated to a temperature sufficient to cause at least some decomposition or a polymorphic transformation of the material to occur, the temperature necessary being normally less than 1000° C. and frequently in the range 300–800° C. Pressure is applied while the decomposition reaction or transformation is occurring. The heat and pressure can then be removed from the formed product and it will be found that the product will have very high compressive strength and high density. To obtain comparable strength and density in the refractory oxides mentioned above, it is generally necessary to sinter them at temperatures considerably above 1400° C. for a prolonged period of time. Also normally improved by the process of the invention will be dimensional tolerances of the finished product.

Use of the process of this invention can also eliminate certain intermediate steps such as prefabrication, drying, etc. now used in known processes with obvious economical advantages.

The raw materials may be heated while still in the forming die or may be removed from the die and then otherwise suitably heated to the required temperature and pressed. If left in the die then pressure may be readily applied during a decompositon reaction or transformation through the die and its associated press. Otherwise other means, which may include impact or hammer blows or any other continuous pressure transmitting device can be provided.

Normally it will be most convenient to form the oxide product in a die and while maintaining pressure on the product, heat it to the necessary temperature whereupon the heat source and the pressure may be removed and the finished product removed from the die.

The particularly unique aspect of this discovery is that a considerable densification and strengthening can be achieved by utilizing a temperature substantially less than the usual sintering or standard hot pressing temperature for the material involved. From the commercial standpoint this decrease in the temperature necessary to achieve densification and strengthening is of particular significance in that dies suitable for use in the process of the present invention can be made of materials currently commercially avaliable at a reasonable cost. Additionally, because of the lower temperatures, heating costs will be substantially reduced.

A further significant aspect of the process of this invention is the relatively short period of time required for densification of oxide products as compared with known processes. The time requirement is dependent on two factors—that length of time to bring the mass of material forming the product up to the required temperature and the reaction or polymorphic transformation rate at any temperature. The process can be completed in the order of minutes by choice of a suitable temperature.

In carrying out the process of the invention, any form of heat and pressure source may be used which is sufficient to both exert the required pressure, and heat the raw material to form the finished product to the required temperature in the required time. The process can be carried out in air, nitrogen or any inert atmosphere, and the die used should be such as to permit the escape of gases formed during application of heat and pressure.

As indicated the material used to form the oxide products may include any compounds which on heating decompose to produce an oxide or oxides as well as, of course, materials in oxide form which on heating undergo apolymorphic transformation. If required, these raw materials before being subjected to the process of the present invention, may be mixed with fillers and/or reinforcing materials such as metallic or non-metallic fibres, natural rocks (powdered), sands, etc. and also metal powders to produce cermets (that is ceramic-metal composites, and metal-ceramic laminates). Depending upon the conditions used it may be possible to enhance the physical properties of the product by reinforcement with metal powders.

Generally speaking however, where an oxide is mixed with other materials the decrease in the percentage of oxide present will normally result in a product having correspondingly less compressive strength than the same product formed from pure or substantialy pure oxide, with the exception of cermets.

In the case of iron oxides, siderite ($FeCO_3$) can be sintered by using its decomposition reaction ($FeCO_3 \rightarrow FeO+CO_2$), which if carried out in air or oxygen subsequently will be transformed into $Fe_3O_4$ and $Fe_2O_3$, all under pressure. Spark plugs can be produced from mixtures of alumino-compounds (which on decomposition will give $Al_2O_3$) and talc. Talc is a hydrated magnesium silicate, which also decomposes at about 1000° C. and water molecules are eliminated from the structure. The decomposition reactions of both the alumino-compounds and talc can be utilized for densification and fabrication of spark plugs. Commercial spark plugs are also made from a similar composition or from pure alumina. Dense MgO can be produced by using a decomposible compound such as $MgCO_3$ which on decomposition will give $MgO$ and when the reaction is made to occur under pressure, very dense MgO can be produced and fabricated. Similarly decompositon reactions can be utilized (under pressure) for fabrication and densification of, for example, $UO_2$, $ThO_2$ and BeO.

In the case of alumina, materials already fabricated and densified by the process of this invention using a decomposition reaction can be further densified and strengthened by the use of polymorphic transformations under pressure. Materials already prepared by applying pressure during a dehydroxylation reaction, including clays in accordance with the application referred to above, may beg round and finally fabricated into any shape and size by the process of this invention, that is using polymorphic transformations.

Generally speaking, the process of this invention can also be used as an intermediate step in any process of fabrication and/or densification. For example, as noted above, materials (excluding non-stabilized $ZrO_2$) can be subjected to the process of this invention and subsequently sintered at a higher temperature for final processing. For example, there are several polymorphic transformations in alumina in the temperature range of 500–1150° C. as shown in Table 4. All or some of these reactions may be used under pressure for fabrication and/or densification. Iron oxide can be produced and fabricated in all shapes and sizes by using the $\gamma \rightarrow \alpha Fe_2O_3$ phase transformation while under pressure. However, it should be pointed out here that these transformations are slow processes and response to the reactive hot pressing would vary very widely, depending upon the extent of the structural rearrangements that take place during these transformation processes.

As indicated in carrying out the process of the present invention, the raw materials involved must undergo a polymorphic transformation or a decomposition reaction initiated by the application of heat while the material is under pressure. The pressure which is used will vary widely, there being theoretically no known upper limit and any pressure which it is practically possible to obtain can be used to control the final characteristics of the product in that normally the greater the pressure utilized during the phase transformation the greater will be the density of the final product and also the greater will be its compressive strength. Also any practical means can be utilized to apply the required pressure. Pressures within the practical range of 2000 to 25,000 p.s.i. have been used.

In the case of very rapid polymorphic transformations such as those which occur for example in zirconia, in carrying out the process of the present invention the oxide can, normally with some benefit, be cycled through the transformation temperature or temperature range in that there is a hysteresis effect in the temperature of transformation, with of course the cycling being carried out while the oxide is maintained under pressure, either constant or variable.

Subsequently if required, pressure can be again applied to or maintained on the product (excluding non-stabilized $ZrO_2$) while the product is heated to a temperature which is higher than the first transformation temperature thereby to obtain further possible densification of the product. In some instances the product can also with benefit be subjected to a higher heat without application of pressure. (This is to obtain high-temperature-stable crystal phases in the product.)

To achieve maximum product strength and density, where a polymorphic transformation is being utilized, pressure must be applied before the transformation temperature or temperature range of the oxide involved is reached (in the case of irreversible transformations) and furthermore in the case of reversible transformations the pressure must be maintained until the transformation process is substantially completed. Pressure should also preferably be applied before the decomposition temperature is reached and maintained until completion of the reaction. However significant benefits are realized if the pressure is applied during at least part of the transformation or decomposition.

The actual temperature or temperature range employed will vary from oxide to oxide or compound to compound and is also altered by the presence of impurities in the oxide or compound. It has been further observed that the temperature or temperature range to be used will frequently depend on such factors as the thermal history, origin, impurity content, and grain size of the oxide or compound, (and as the case may be) added materials, employed. Also the time factor involved in carrying out the process of the present invention has been found to be dependent on a number of variables and as a result no specific temperature or temperature range or rate of transformation can be specified, in general it being necessary to consider each oxide or compound individually. As a result of these variables it has been found that the response of any particular oxide to the process of the present invention varies widely and appears to depend primarily upon the structural changes which accompany the transformation. For example it has been observed that the final transformation reactions which result in the formation of alpha-alumina respond best to the process, this transformation normally occurring at a temperature of about 1150° C. In the case of iron oxide ($Fe_2O_3$) the $\gamma$ to the $\alpha$ transformation responded well to the process. However, all decomposition reactions while under pressure responded very well for densification and strengthening.

The following examples are given for the purpose of illustrating the present invention without being intended to limit its scope.

Example 1

Analytical grade zirconia ($ZrO_2$ approximately 97% $ZrO_2$—purified and anhydrous—available as a Fisher Laboratory Chemical from the Fisher Scientific Company) was compacted into a cylinder having approximate dimensions of 1 centimeter in diameter and 1 centimeter in height using a hand press.

The hot pressing was carried out in a Phillips induction heating unit using a graphite die which functioned both as a susceptor and hot pressing component.

The cylindrically shaped specimen was placed in the graphite die which was provided with floating plungers and the die was placed in position in a press provided with a pneumatic ram fed from a gas cylinder with the pressure control being regulated by a gas regulator. The die was encased in Vycor tubing and the complete apparatus was flushed with argon for five minutes to protect the graphite die. A pressure of 4,000 p.s.i. was applied to and maintained on the specimen while the specimen was cycled very slowly through the temperature range noted below in Table 1, that is using about 30 minutes for each cycle so that during cycling under pressure the reversible phase transition (monoclinic $\rightleftharpoons$ tetragonal) occurred. As a final step before the specimens were tested, they were subsequently heated in air at 700° C. for 45 minutes without being subjected to any pressure to burn off the carbon on the surface of the specimens and to re-oxidize them in case they were reduced by the graphite forming the die during the hot pressing. The results were as follows.

TABLE 1.—RESULTS OF CYCLICAL REACTIVE HOT PRESSING OF NON-STABILIZED $ZrO_2$ (REVERSIBLE TRANSFORMATION)

| No. of Cycles from 800–1,200° C | 1 | 3 | 7 | No cycling, pressure applied and specimen heated to 1,500° C. for 1 hour |
|---|---|---|---|---|
| Density (gm./cc.) | 4.35 | 4.68 | 5.56 | 5.50 |
| Percent Theoretical Density | 77 | 84 | 99.3 | 98.3 |
| Compressive Strength, p.s.i. | 20,000 | 39,000 | 55,000 | (¹) |

¹ No strength (failure due to recrystallization).

Example 2

Following the general procedure set out in Example 1, and again utilizing a pressure of 4,000 p.s.i. the following results were obtained on pure zirconia (99.7% $ZrO_2$, impurities, Hf—100 p.p.m., Ca—155 p.p.m., Mg—110 p.p.m. and Si—320 p.p.m., average grain size 0.45 micron as supplied by A. D. MacKay, Inc., New York, N.Y.) using the temperature range set out below.

TABLE 2.—RESULTS OF CYCLICAL REACTIVE HOT PRESSING OF NON-STABILIZED $ZrO_2$ (REVERSIBLE TRANSFORMATION)

| Specimen No | A | B | C | D | E |
|---|---|---|---|---|---|
| No. of Cycles 750–1,200° C | 3 | 6 | 12 | 6 | No cycling, hot pressing at 1,500° C., 20 minutes (pressure applied when temp. reached) |
| Reheat under pressure: | | | | | |
| At | | 1,400–1,500° C. | 1,450° C. | 1,500° C. | |
| Time | | 25 min. | 5 min. | 1 hour | |
| Percent Theoretical Density | 86 | >98 | 98 | 95 | 98 |
| Compressive Strength, p.s.i. | 29,000 | ~50,000 | ~50,000 | No strength | No strength |

Example 3

Following the general procedures set out in Example 1 and utilizing a decomposition reaction while under pressure for densification and fabrication to produce oxide bodies, the following results were obtained.

TABLE 3

| Mineral | Oxide Product | Applied Pressure, p.s.i. | Reactive Hot Pressing Temperature, °C. | Hot Pressing Time, min. | Cold Compressive Strength, p.s.i. | Bulk Density, gm./cc. |
|---|---|---|---|---|---|---|
| Bauxite | Al$_2$O$_3$ | 11,750 | 750 | 5 | 7,500 | 1.58 |
| Gibbsite | Al$_2$O$_3$ | 11,750 | 650 | 10 | 8,000 | 1.52 |
| Bayerite | Al$_2$O$_3$ | 11,750 | 780 | 10 | 4,500 | 1.46 |
| Gibbsite+colloidal Al$_2$O$_3$ | Al$_2$O$_3$ | 12,000 | 720 | 5 | 23,600 | 1.70 |
| Diaspore | Al$_2$O$_3$ | 11,750 | 700 | 10 | 4,000 | 2.20 |
| Colloidal Al$_2$O$_3$ | Al$_2$O$_3$ | 11,750 | 700 | 10 | 15,000 | 1.90 |
| Magnesite natural | MgO | 10,400 | 800 | 10 | 8,400 | 1.66 |
| Magnesite Sea water | MgO | 4,500 | 700 | 15 | 8,000 | 1.58 |
| Brucite | MgO | 10,400 | 750 | 5 | 10,500 | 1.82 |
| Siderite | FeO | 11,750 | 750 | 10 | 31,000 | 3.23 |
| ADU (ammonium diuranate) | UO$_2$ | 11,750 | 700 | 15 | 7,000 | (¹) |
| Talc | MgOx-SiO$_2$ | 12,400 | 1,050 | 5 | 23,700 | 2.42 |

¹ Not measured.

Example 4

Following Table 4 noted below, different forms of alumina were obtained as follows:

TABLE 4.—DECOMPOSITION AND TRANSFORMATION SEQUENCES OF ALUMINA HYDRATES IN DRY AIR

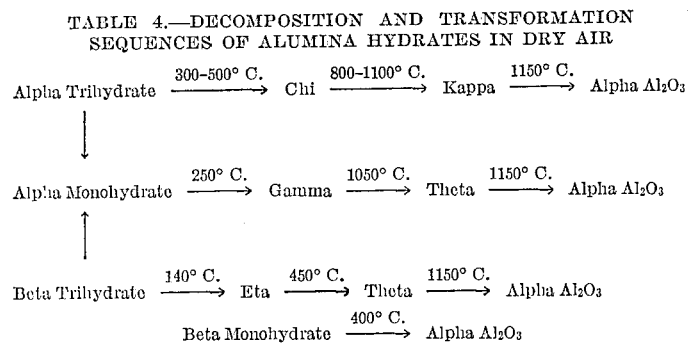

(A) Gibbsite (alpha-trihydrate) was decomposed at 650° C. without pressure to obtain chi-alumina. The chi-alumina so obtained was then subjected to the same general process as outlined in Example 1 without cycling with the following results.

TABLE 5.—RESULTS OF REACTIVE HOT PRESSING OF Al$_2$O$_3$ USING POLYMORPHIC IRREVERSIBLE TRANSFORMATION

| Specimen No. | G$_1$ | G$_2$ | G$_3$ | G$_4$ |
|---|---|---|---|---|
| Max. Temperature (° C.) | 650 | 700 | 1,070 | 1,050 |
| Pressure Applied at (° C.) | 650 | 700 | 600–1,070 | 1,050 |
| Applied Pressure (p.s.i.) | 12,000 | 12,000 | 12,000 | 12,000 |
| Time (min.) | 10 | 10 | 10 | 10 |
| Density (gm./cc.) | 1.28 | 1.22 | 1.45 | 1.41 |
| Compressive Strength (p.s.i.) | 1,100 | 1,740 | 9,000 | 7,450 |

(B) Bayerite (beta trihydrate) was decomposed at 600° C. without pressure to obtain theta-alumina which was subjected to the same general procedure as outlined in Example 1 without cycling, with the following results.

TABLE 6.—RESULTS OF REACTIVE HOT PRESSING OF Al$_2$O$_3$ USING POLYMORPHIC IRREVERSIBLE TRANSFORMATION

| Specimen No. | B$_1$ | B$_2$ | B$_3$ | B$_4$ | B$_5$ | B$_6$ |
|---|---|---|---|---|---|---|
| Temperature (° C.) | 600 | 650 | 1,200 | 1,250 | 820 | 950 |
| Pressure Applied at (° C.) |  | 650 | 650–1,200 | 1,250 | 820 | 680–950 |
| Applied Pressure (p.s.i.) |  | 10,500 | 9,000 | 9,000 | 9,000 | 9,000 |
| Time (min.) |  | 10 | 5 | 5 | 5 | 5 |
| Density (gm./cc.) |  | 1.18 | 1.67 | 1.60 | 1.16 | 1.26 |
| Compressive Strength (p.s.i.) | (¹) | 1,100 | 14,000 | 10,000 | 1,750 | 2,720 |

¹ No strength.

(C) Collodial boehmite (alpha monohydrate) was decomposed at 600° C. without pressure to obtain gamma-alumina which being subjected to the same general procedure as outlined in Example 1 without cycling yielded the following results.

TABLE 7.—RESULTS OF REACTIVE HOT PRESSING OF $Al_2O_3$ USING POLYMORPHIC IRREVERSIBLE TRANSFORMATION

| Specimen No. | $C_1$ | $C_2$ |
|---|---|---|
| Temperature (° C.) | 650 | 1,150 |
| Pressure Applied at (° C.) | 650 | 700 |
| Applied Pressure (p.s.i.) | 10,000 | 10,000 |
| Time (min.) | 10 | 10 |
| Density (gm./cc.) | | 2.30 |
| Compressive Strength (p.s.i.) | Spalled | 40,000 |

Example 5

Ferric Sulphate (hydrated) decomposed at 750° C. without pressure to produce $\gamma\, Fe_2O_3$ was subjected to the same general procedure as outlined in Example 1 without cycling with the following results.

TABLE 8

| | |
|---|---|
| Maximum temperature reached ° C. | 1030 |
| Time (min.) | 5 |
| Pressure applied at ° C. | 800 |
| Applied pressure p.s.i. | 10,000 |
| Compressive strength p.s.i. | 10,000 |

Example 6

Following the general procedure set out in Example 1 the following results were obtained on cermets-ceramic-metal composites, iron and $Al_2O_3$ composites (powder mixtures).

TABLE 9

| Weight Ratio | | Applied Pressure, p.s.i. | Temperature Hot Pressing, ° C. | Hot Pressing Time, min. | Cold Compressive Strength, p.s.i. | Bulk Density, gm./cc. |
|---|---|---|---|---|---|---|
| Fe | $Al_2O_3$ | | | | | |
| 20 | 80 | 10,000 | 650 | 10 | 30,000 | 2.27 |
| 50 | 50 | 10,000 | 570 | 10 | 37,000 | 3.47 |
| 80 | 20 | 10,000 | 550 | 10 | *49,000 | 5.26 |
| OTHER CERMETS | | | | | | |
| $CuAl_2O_3$ | | | | | | |
| 50 | 50 | 6,000 | 570 | 10 | >50,000 | 3.80 |
| $CrAl_2O_3$ | | | | | | |
| 50 | 50 | 6,000 | 590 | 10 | 48,500 | 3.20 |

*Yield strength.

In summary an improved, novel process for manufacturing dense, hard oxide containing products has been provided which process involves in one of its broadest aspects the heating of a formed composition containing a significant amount of an oxide or a material which on decomposition yields an oxide, to a temperature sufficient to cause molecular bond disruption by one of a polymorphic phase transformation and molecular decomposition in the oxide or material as the case may be and applying pressure to said composition during said bond disruption.

I claim:

1. A process for manufacturing dense hard oxide products comprising:
   providing a charge consisting essentially of at least one compound which on heating to a temperature between about 300° C. and 1000° C. decomposes to yield at least one oxide selected from the group consisting of alumina, magnesia, beryllia, thoria, urania, and iron oxide, said compound not having been previously heated to its said decomposition temperature;
   heating said charge to said decomposition temperature of between 300° C. and 1000° C. and at least while the decomposition is occurring, applying pressure to the charge while confined in a mold cavity, the application of pressure simultaneously with said heat initiated decomposition resulting in the shaping, strengthening and densifying of said charge;
   and recovering the resultant dense oxide product.

2. The process of claim 1 wherein said charge is heated while in the mold cavity.

3. The process of claim 1 in which, after applying pressure to said charge simultaneously with the heat initiated decomposition, the application of pressure is discontinued and the product is further heated to a temperature higher than the temperature to which it was initially heated to cause decomposition.

4. The process of claim 3 wherein pressure is applied to the product during the step of further heating it.

5. A process for manufacturing dense hard cermet products comprising:
   providing a charge consisting esesntially of a cermet forming metal and at least one compound which on heating to a temperature between about 300° C. and 1000° C. decomposes to yield at least one oxide selected from the group consisting of alumina, magnesia, beryllia, thoria, urania, and iron oxide, said compound not having been previously heated to its said decomposition temperature;
   heating said charge to said decomposition temperature of between 300° C. and 1000° C. and at least while the decomposition is occurring, applying pressure to the charge while confined in a mold cavity, the application of pressure simultaneously with said heat initiated decomposition resulting in the shaping, strengthening and densifying of said charge;
   and recovering the resultant dense cermet product.

6. The process of claim 5 wherein said charge is heated while in the mold cavity.

7. The process of claim 5 in which, after applying pressure to said charge simultaneously with the heat initiated decomposition, the application of pressure is discontinued and the product is further heated to a temperature higher than the temperature to which it was initially heated to cause decomposition.

8. The process of claim 7 wherein pressure is applied to the product during the step of further heating it.

References Cited

UNITED STATES PATENTS

| | | | |
|---|---|---|---|
| 1,533,689 | 4/1925 | Betts | 264—332 |
| 1,548,808 | 8/1925 | Miller | 264—332 |
| 2,538,959 | 1/1951 | Ballard | 264—332 |
| 2,915,407 | 12/1959 | Gulton | 264—332 |
| 2,952,535 | 9/1960 | Roake | 75—206 |
| 3,143,413 | 8/1964 | Krapf | 75—206 X |
| 3,177,077 | 9/1965 | Eyraud et al. | 75—206 X |
| 3,141,782 | 7/1964 | Livey et al. | 264—0.5 |
| 3,168,371 | 2/1965 | St. Pierre | 264—0.5 |

FOREIGN PATENTS 247,495  10/1963  Australia.

OTHER REFERENCES

Ceramic Bulletin, vol. 44, No. 44, No. 3 (1965), pp. 258–259.

REUBEN EPSTEIN, *Examiner.*

R. L. GRUDZIECKI, *Assistant Examiner.*